United States Patent [19]
Sawaki et al.

[11] Patent Number: 5,493,406
[45] Date of Patent: Feb. 20, 1996

[54] APPARATUS FOR MEASURING SPECTRAL CHARACTERISTICS OF AN OPTICAL FIBER COMPONENT

[75] Inventors: Akihiro Sawaki; Musubu Koishi, both of Hamamatsu, Japan

[73] Assignee: Hamamatsu Photonics K.K., Hamamatsu, Japan

[21] Appl. No.: 426,588

[22] Filed: Apr. 21, 1995

Related U.S. Application Data

[63] Continuation of Ser. No. 97,011, Jul. 27, 1993, abandoned.

[30] Foreign Application Priority Data

Jul. 31, 1992 [JP] Japan ................... 4-205290

[51] Int. Cl.$^6$ ................................................. G01N 21/84
[52] U.S. Cl. ................................................. 356/73.1
[58] Field of Search ....................... 356/73.1; 250/227.17

[56] References Cited

U.S. PATENT DOCUMENTS

| | | | |
|---|---|---|---|
| 4,257,707 | 3/1981 | Liertz et al. ........................... | 356/73.1 |
| 4,900,920 | 2/1990 | Federmann et al. .................. | 250/227.17 |
| 5,206,701 | 4/1993 | Taylor et al. ........................... | 356/325 |

FOREIGN PATENT DOCUMENTS

| | | |
|---|---|---|
| 59-61723 | 4/1984 | Japan . |
| 2144534 | 3/1985 | United Kingdom . |

OTHER PUBLICATIONS

Patent Abstracts of Japan, vol. 9, No. 210 (P–383) (1933) 28 Aug. 1985 & JP–A–60 070 335 (Nippon Denshin Denkwa Kosha) 22 Apr. 1985 *abstract*.

Freyhardt et al., "Prinzipien Und Anwendungsbeispiele Der Optischen Messtechnik", Nachrichtentechnische Berichte, No. 3, Dec. 1986, Backnang de, p. 62.

J. Thomas Brownrigg, "Performance of a Miniature Diode–Array Spectrometer", American Holographic, Inc., Spectroscopy, vol. 6, No. 2, publication date Feb. 1991.

Primary Examiner—Vincent P. McGraw
Attorney, Agent, or Firm—Cushman Darby & Cushman

[57] ABSTRACT

This invention relates to an optical fiber component characteristics measuring device which can measure with high precision for a short period of time characteristics of the optical fiber component. The optical fiber component characteristics measuring device comprises a plurality of light sources for emitting light of set different wavelengths, optical coupling means for mixing light from the light sources, coupling means for supplying mixed light from the optical coupling means to an optical fiber component to be measured, spectroscoping means for spectroscoping light from the optical fiber component to be measured, and photoelectric means for parallelly detecting spectra of the light of the respective wavelengths outputted by the spectroscoping means and for converting the spectra into electric signals corresponding to the respective wavelengths. On the input side of the spectroscoping means there is provided optical switch means for switching sequentially between that of light outputted from the plurality of output optical fibers of the optical fiber component to be measured, which has one of said different wavelengths. The light from the optical switch means is detected by the spectroscoping means, whereby characteristics of the optical fiber component including a plurality of output optical fibers can be measured.

14 Claims, 4 Drawing Sheets

APPARATUS FOR MEASURING SPECTRAL CHARACTERISTICS OF AN OPTICAL FIBER COMPONENT

This application is a Rule 60 continuation of application Ser. No. 08/097,011, filed Jul. 27, 1993, now abandoned.

BACKGROUND OF THE INVENTION

1. Field of the Invention

This invention relates to an optical fiber component characteristics measuring apparatus for measuring characteristics of optical fiber components which are used in transmission control of optical signals and optical signal processing in the fields of optical transmission and optical communication techniques.

2. Related Background Art

As techniques of optical transmission and optical communication, such as the so-called ISDN have been developed, various optical fiber components for use in transmission control of optical signals containing information and processing of optical signals have been studied and developed. Such optical fiber components include for example optical fiber couplers and optical fiber filters.

One of the former optical fiber couplers comprises one or at least two optical fibers on the input side, and one or at least two optical fibers on the output side, which are connected to each other. Such optical coupler having one optical fiber on the output side performs the functions of separating only a component of a light beam incident on the optical fiber on the input side, which (component) corresponds to a spectral characteristic of the output optical fiber, and propagating the component. One of the optical couplers having at least two optical fibers on the output side has a function of dividing a light beam incident on an optical fiber on the input side into components having corresponding spectral characteristics of the output optical fibers to output or propagate the components from or through the corresponding output optical fibers. Specifically in an optical fiber coupler having one input optical fiber and a first output optical fiber of a 1300 nm-spectral characteristic and a second optical fiber of a 1550 nm spectral optical fiber (which is called 1×2 optical fiber coupler), when a mixed beam of a 1300 nm-wavelength and a 1550 nm-wavelength is incident on the input optical fiber, the 1300 nm-wavelength light beam and the 1550 nm-wavelength light beam are divided in accordance with their spectral characteristics to be outputted from or propagated through the corresponding output optical fibers.

The optical couplers can propagate a specific-wavelength light beam of a mixed light beam of a plurality of wavelengths, and can divide a mixed light beam into light beams of respective wavelengths. The optical couplers exert good functions which facilitate selections, expansions, etc. of communication networks of optical communication systems. Studies and developments are being made on improvement of separation characteristics of respective wavelengths, and improvement of qualities for better division characteristics and prevention of crosstalks. Also known is an optical coupler which comprises a plurality of optical fibers on the output side which have the same spectral characteristics, so that a light beam incident on an optical fiber on the input side is divided by a uniform division ratio to the respective output optical fibers. Studies and developments also being made on improvement of uniformity of division ratios.

In the last-described optical fiber coupler, optical fibers are used as optical filters so that the passage of light beams of unnecessary wavelengths are prohibited from admitting light beams of necessary wavelengths. Specifically, an optical fiber filter for passing light beams of a 1550 nm-wavelength does not pass light beams of other wavelengths, e.g., a 1300 nm-wavelength. When a mixed light beam of a 1550 nm-wavelength and a 1300 nm-wavelength is incident, the light beam of a 1550 nm-wavelength is admitted. Thus, the optical fiber filter passes light beams of necessary wavelengths and does not pass light beams of unnecessary wavelengths. Studies and developments are being made on optical fiber filters having the so-called transmission/cuttoff characteristics improved.

Thus, optical fiber components for controlling light beams have been studied and developed with optical techniques. To further advance studies and developments of innovational and superior optical fiber components, an optical fiber components characteristics measuring apparatus for measuring characteristics of optical fiber components is essential.

A conventional optical fiber characteristics measuring apparatus of the structure of FIG. 7 is known. This device is for measuring spectral characteristics of an optical coupler (1×2 optical fiber coupler) 5 having one optical fiber 5a on the input side, and two optical fibers 5b, 5c having different spectral characteristics on the output side. The apparatus comprises an input mechanism for applying light to the optical fiber coupler to be measured, and an output mechanism for receiving light beams outputted from the optical fiber coupler 5 for various analyses.

The input mechanism comprises a light source 1 provided by a halogen lamp for emitting light having a flat spectral characteristic over a wide wavelength range, a chopper mechanism 2 for passing or interrupting the light, a spectroscope 3 for spectroscoping the light passing the chopper mechanism 2, and controller 4 for sweeping wavelengths of the spectroscope 3. The light from the spectroscope 3 is incident on the input optical fiber 5a through an optical connector.

The output mechanism comprises a first germanium photodiode 6 and a second germanium photodiode 7 which respectively detect the light from the output optical fiber 5b and the output optical fiber 5c, and photoelectrically generate electric signals proportional to intensities of the detected light, and lockin amplifiers 8, 9 which respectively amplify the electric signals from the photodiodes 6, 7, and an A/D converter 11 which receives the amplified electric signals through a selector circuit 10, and converts them into digital data to supply the digital data to a signal analyzing circuit 12, such as a computer.

When an operator inserts an optical fiber coupler to be measured between the input mechanism and the output mechanism and starts the measurement, light from the light source 1 is interrupted by the chopper mechanism 2 to be applied to the spectroscope 3. The light diffracted into respective wavelengths by the spectroscope 3 is separated into light of the respective wavelengths by mechanical sweep of the controller 4 to be incident on the input optical fiber 5a of the optical fiber coupler 5 to be measured. The light of the respective wavelengths which has passed through the output optical fibers 5b, 5c is photoelectrically converted by the photodiodes 6, 7 and electric signals S1, S2 proportional to intensities of the transmitted light of the respective wavelengths. The respective electric signals S1, S2 are amplified and sample-held by the lockin amplifiers 8, 9, then are delayed from each other by the selector 10 to be supplied to the A/D converter 11. Thus, digital data D1 corresponding to the electric signal S1, and digital data D2 corresponding to the electric signal S2 are supplied to the signal processing circuit 12 in a time series. A reference signal frequency of the lockin amplifiers 8, 9 are synchronous with an interrupted repeated frequency of the chopper mechanism 2. Light of a different wavelength is incident by the mechanical sweep of the controller 4 from the spectroscope 3 on the input optical fiber 5a at each chopping cycle, and the digital data D1, D2 of the respective wavelengths are supplied to the signal processing circuit 12. Respective spectral characteristics on the output optical fibers 5b, 5c are available as digital data. These digital data D1, D2 are subjected to signal processing, or displayed on a monitor television, whereby measured results of the respective spectral characteristics on the output optical fibers 5b, 5c are presented to the operator.

But in such conventional optical fiber component characteristics measuring apparatus, a spectrum generated in the spectroscope 3 is mechanically swept by the controller 4 to sequentially separate light of respective wavelengths. The mechanical sweep mechanically wears the controller 4 after a long time of use, and its reproducibility of wavelengths is lowered, with the result that wavelengths incident on optical fiber components are deflected and spectral characteristics of the optical fiber components cannot be measured with high precision. This has been a problem of the conventional optical fiber component characteristics measuring apparatus.

The sweeps of the controller 4, which are mechanically conducted, are slow, with the result that it takes a long time to provide spectral characteristics of all wavelengths of an optical fiber component to be measured. Thus another problem is that a measuring operation takes a long period of time.

A halogen lamp, which has a substantially flat. spectral characteristic in the required infrared range, is used as the light source 1. But the halogen lamp has low radiation intensities, and output light of an optical fiber component 5 to be measured is weak. A further problem is that the measuring precision on the output mechanism is low.

SUMMARY OF THE INVENTION

This invention has been made in view of these problems of the conventional art. An object of this invention is to provide an optical fiber component characteristics measuring apparatus which has a function of measuring spectral characteristics of optical fiber components with high precision for a short period of time.

To achieve this object, this invention comprises a plurality of light sources for emitting light having set different wavelength ranges and substantially flat light intensity distributions, optical coupling means for mixing the light from the light sources, coupling means for supplying the mixed light from said optical coupling means to an optical fiber component to be measured, spectroscoping means for spectroscoping the light from the optical fiber component to be measured, and photoelectric means for parallelly detecting spectra of the light of the respective wavelengths outputted by the spectroscoping means and for converting the spectra into electric signals corresponding to the respective wavelengths.

This invention is for measuring spectral characteristics of an optical fiber component including a plurality of output optical fibers for outputting light incident on input optical fibers thereof in accordance with respective spectral characteristics of light. Accordingly, this invention comprises a plurality of light sources for emitting light having set different wavelength ranges and substantially flat intensity distributions, coupling means for mixing the light from the light sources, coupling means for supplying the mixed light from the optical coupling means to the input optical fiber of the optical fiber component to be measured, optical switch means for switching sequentially between the light outputted from the plurality of output optical fibers of the optical fiber component to be measured, which has one of the different wavelengths, spectroscoping means for spectroscoping the light from the optical switch means, and photoelectric means for parallelly detecting spectra of the light of the respective wavelengths outputted by the spectroscoping means and for converting the spectra into electric signals corresponding to the respective wavelengths.

In the optical fiber component characteristics measuring apparatus, the plurality of light sources are light emitting diodes, super-luminescence diodes, multi-quantum well laser diodes, or others. The photoelectric means is a linear image sensor including a plurality of pixels arranged along distributions of the spectra, a photodiode array including a plurality of photodiodes arranged along the distributions of the spectra, or others.

According to this invention of the above-described structures, light of a plurality of wavelengths is mixed by the optical coupling means, and the mixed light is incident on an optical fiber component to be measured. The spectroscoping means generates spectra of the light outputted from the optical fiber component to be measured. The photoelectric means parallelly detects the spectra for the respective wavelengths. Thus, reference incident light (the mixed light) on the optical fiber component to be measured is not set by the mechanical sweep means, such as the chopper mechanism and the controller, as is in the conventional apparatus. Instead, the reference incident light is generated by the stationary optical mechanism. The mechanical precision and transient deflections are not encountered in the device according to this invention. A measuring time can be decreased, and SN characteristics can be improved. The apparatus according to this invention can produce such advantageous effects.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

An embodiment of this invention will be explained with reference to the drawings attached hereto. First, the structure of the device according to this embodiment will be explained with reference to FIG. 1. The optical fiber component characteristics measuring apparatus according to this embodiment is for measuring spectral characteristics of an optical fiber coupler 25 (1×2 optical fiber coupler) having one optical fiber 25a on the input side, and two optical fibers 25b, 25c on the output side having different spectral characteristics from each other. The device includes an input mechanism for applying light to the optical fiber coupler 25 to be measured, and an output mechanism for receiving the light from the optical fiber coupler 25 and supplying the light for various analyses.

Figure 3:
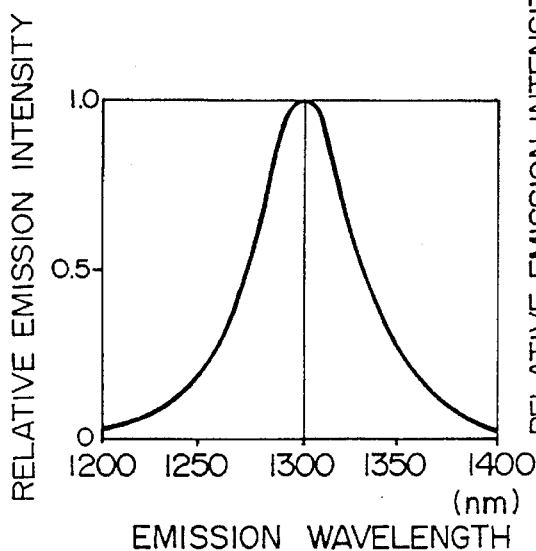
FIG. 3 is a view of a wavelength characteristic of light emitted from a light source used in the embodiments of this invention.
Figure 4:
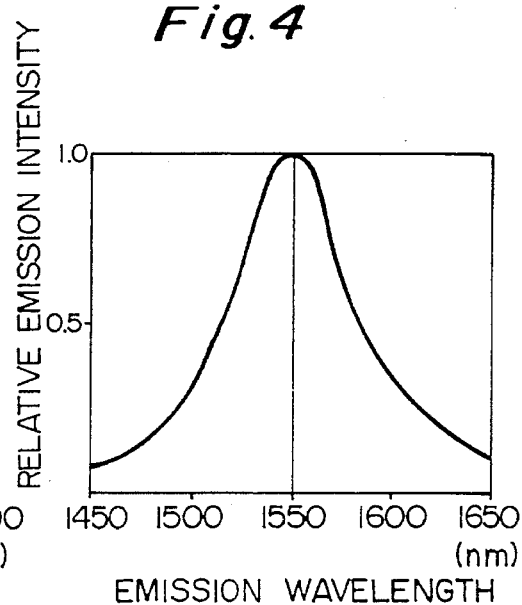
FIG. 4 is a view of a wavelength characteristic of light emitted from a light source used in the embodiments of this invention.

The input mechanism includes a first and a second light emitting devices 22, 23 which emit light of set wavelengths when supplied with an electric power from a drive circuit 21, and an optical fiber coupler 24 which receives the light through a first and a second input optical fibers 24a, 24b and mixes the light therefrom to output mixed light through an output optical fiber 24c. The first light emitting element 22 is provided with a light emitting diode which emits light having a peak at a 1300 nm-wavelength and the broad spectral characteristic as shown in FIG. 3, i.e., a spectral characteristic with a range spreading relatively widely from the peak wavelength. The second light emitting device 23 is provided with a light emitting diode which emits light having a peak at a 1550 nm-wavelength and a broad spectral characteristic as shown in FIG. 4. The respective optical fibers 24a, 24b, 24c of the optical fiber coupler 24 are provided with optical fibers which have the same spectral characteristics and can pass light of the wavelength range of at least that shown in FIG. 4, so that the light from the first and the second light emitting devices 22, 23 is mixed as they are, and outputted. The mixed light from the output optical fiber 24c is incident on the input optical fiber 25a of the optical fiber coupler 25 to be measured. The output optical fiber 24c and the input optical fiber 25a are connected to an optical connector.

The output mechanism includes an optical switch 26, a first input optical fiber 26a of the optical switch 26 coupled to the first output optical fiber 25b of the optical fiber coupler 25 to be measured through an optical connector, and a second input optical fiber 26b of the optical switch 26 coupled to the second output optical fiber 25c through the optical connector. The optical switch 26 switches in response to a switch control signal CH from a signal processing circuit 32 which will be explained later, so that the light incident on the first input optical fiber 26a and the light incident on the second input optical fiber 26b is alternately supplied to an output optical fiber 26c. The respective optical fibers 26a, 26b, 26c of the optical switch 26 have the same spectral characteristics as the optical fibers 24a, 25b 24c of the optical fiber coupler 24, and the optical switch 26 is provided by a 1×2 optical switch by Seiko Denshi Kogyo Kabushiki Kaisha (Type: SW-011) or others.

A spectroscope 27 is coupled to the output optical fiber 26c to output spectra of light outputted from the output optical fiber 26c.

A linear image sensor 28 including a plurality of photodetecting pixels formed in one row in a set direction is coupled to the spectroscope 27 on the output side. The sensor 28 is so arranged that the distributions of the spectra outputted from the spectroscope 27, and the direction of the row of a plurality of photodetecting pixels are opposed to each other. That is, when the optical switch 26 is switched to supply the light from the first input optical fiber 26a to the output optical fiber 26c, a spectrum distribution corresponding to a spectral characteristic of the output optical fiber 25b of the optical fiber coupler 25 to be measured is photoelectrically converted by the photodetecting pixels. When the optical switch 26 is switched to supply the light from the second input optical fiber 26b to the output optical fiber 26c, a spectrum distribution corresponding to a spectral characteristic of the output optical fiber 25c of the optical fiber coupler 25 to be measured is photoelectrically converted by the photodetecting pixels. In this embodiment, the linear image sensor 28 is provided by a germanium image sensor so that the photosensitivity can be improved in the infrared wavelength range including 1300–1550 nm.

Pixel signals S generated at the respective photodetecting pixels of the linear image sensor 28 are read by a read control circuit 29 in a time series in synchronization with a set read scan cycle and sequentially converted an A/D converter 30 into pixel data D for each set bit. These pixel data D are supplied to a signal analyzing circuit 32 with a computing function, as of a microcomputer or others, through an interface circuit 31.

Figure 1:
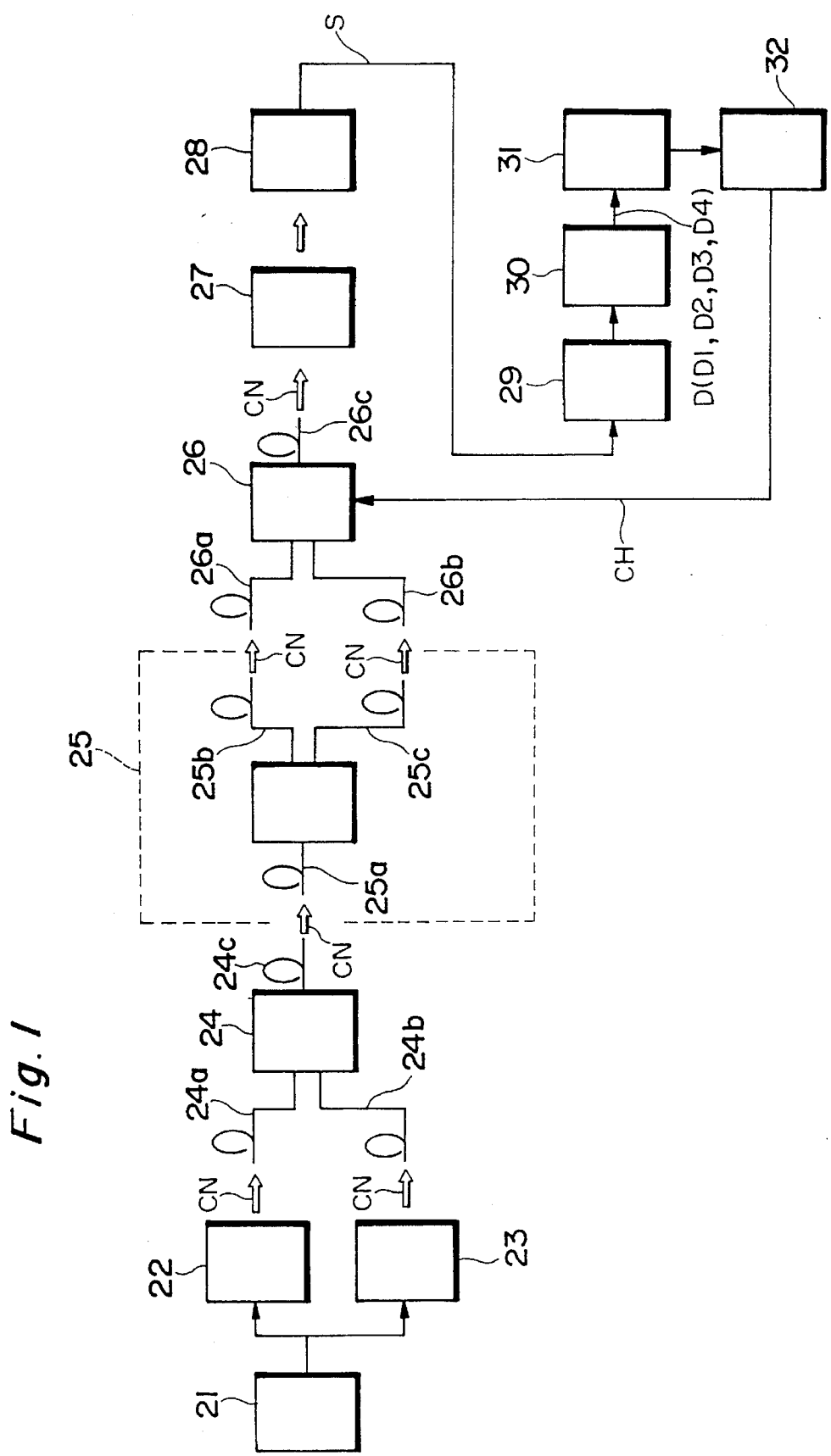
FIG. 1 is a block diagram of the optical fiber component characteristics measuring device according to one embodiment of this invention.

In FIG. 1 the portions indicated by the mark CN are optical connecting means, such as optical connectors and others.

Next the operation of this embodiment will be explained. When an operator inserts the optical fiber coupler 25 to be measured between the input mechanism and the output mechanism, and the measurement is started, light of a 1300 nm-wavelength from the light source 22, and light of a 1550 nm-wavelength from the light source 23 are mixed in the optical fiber coupler 24. This mixed light is incident on the input optical fiber 25a of the optical fiber coupler 25 to be measured. Then, the mixed light is divided in accordance with respective spectral characteristics of the output optical fiber 25b and the output optical fiber 25c, and the light corresponding to the spectral characteristic of the output optical fiber 25b is supplied to the first input optical fiber 26a of the optical switch 26, and the light corresponding to the spectral characteristic of the output optical fiber 25c is supplied to the second input optical fiber 26b of the optical switch 26. Based on a switch control signal CH from the signal analyzing circuit 32, the optical switch 26 supplies, in response to a switch control signal CH from the signal analyzing circuit 32, the light from the first optical fiber 26a to the spectroscope 27 through the output optical fiber 26c for a set period of time, and then, in response to a switch control signal CH from the signal analyzing circuit 32, outputs the light from the second input optical fiber 26b for a set period of time to the spectroscope 27 through the output optical fiber 26c. The spectroscope 27 generates a spectrum of the light supplied for every period of time, and the linear image sensor 28 photoelectrically generates pixel signals S for the respective photodetecting pixels. The respective pixel signals S read in a time series by the read control circuit 29 are converted into pixel data D by the A/D converter 30. These pixel data D are supplied to the signal analyzing circuit 23 through the interface circuit 31.

The signal analyzing circuit 32 corrects the pixel data D1 corresponding to the light from the output optical fiber 25b, based on the spectral characteristic intrinsic to the whole of the input and the output mechanisms, and uses the corrected pixel data D1' as actual spectral characteristic data of the output optical fiber 25b. The pixel data D2 corresponding to the light supplied from the output optical fiber 25c is corrected based on the spectral characteristic intrinsic to the whole of the input and the output mechanisms, and the corrected pixel data D2' is used as actual spectral characteristic data of the output optical fiber 25c. These pixel data D1', D2' are subjected to signal processing and displayed on a monitor television to present the operator the thus-measured spectral characteristics of the respective output optical fibers 25b, 25c.

In this embodiment, reference incident light to be incident on the optical fiber coupler to be measured is generated by the stationary optical mechanism in place of the mechanical sweep means, such as the chopper mechanism and the controller in the conventional device. Accordingly, mechanical precision and transient deflections are never problems, a measuring time can be decreased, and improved S/N ratios can be obtained.

Next, another embodiment of this invention will be explained with reference to FIG. 2. The optical fiber component characteristics measuring apparatus according to this embodiment is for measuring spectral characteristic of an optical fiber coupler (2×4 optical fiber coupler) 48 including two input optical fibers 48a, 48b, and four output optical fibers 48c–48f. The apparatus comprises an input mechanism for supplying light to an optical fiber 48 to be measured, and an output mechanism for receiving the light from the optical fiber 48 to be measured for various analyses.

The input mechanism includes a first to a fourth light emitting devices 42–45 for emitting light of set wavelengths generated by electric powers supplied by a drive circuit 41, an optical fiber coupler 46 which receives light from the respective light emitting devices 42–45 through a first to a fourth input optical fibers 46a–46d, mixes the light, and outputs the mixed light from the output optical fiber 46e, and an optical switch 47 which switches to supply the light from the output optical fiber 46e alternately to the two input optical fibers 48a, 48b.

Figure 5:
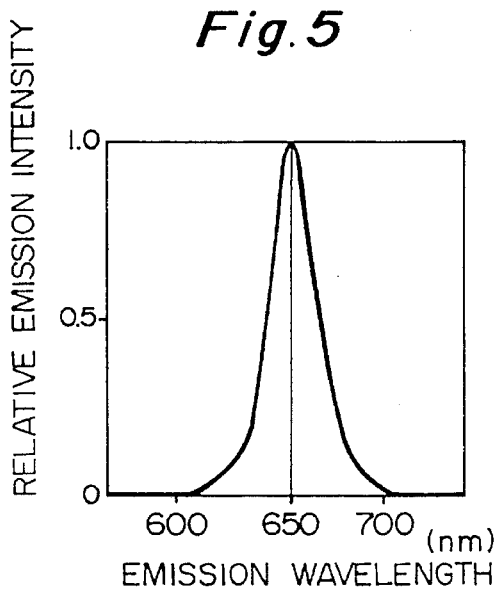
FIG. 5 is a view of a wavelength characteristic of light emitted from a light source used in the embodiments of this invention.
Figure 6:
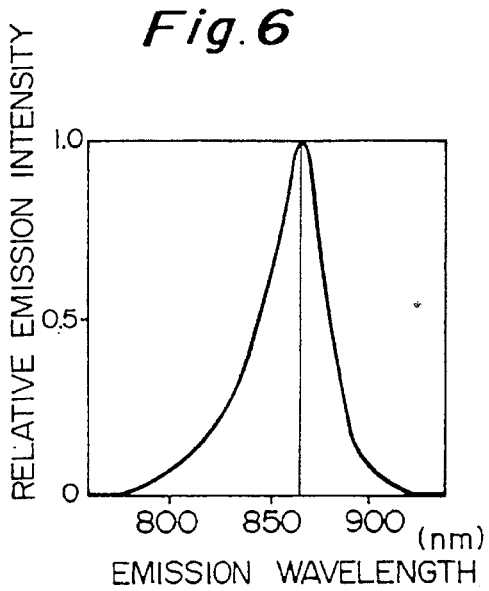
FIG. 6 is a view of a wavelength characteristic of light emitted from a light source used in the embodiments of this invention.
Figure 7:
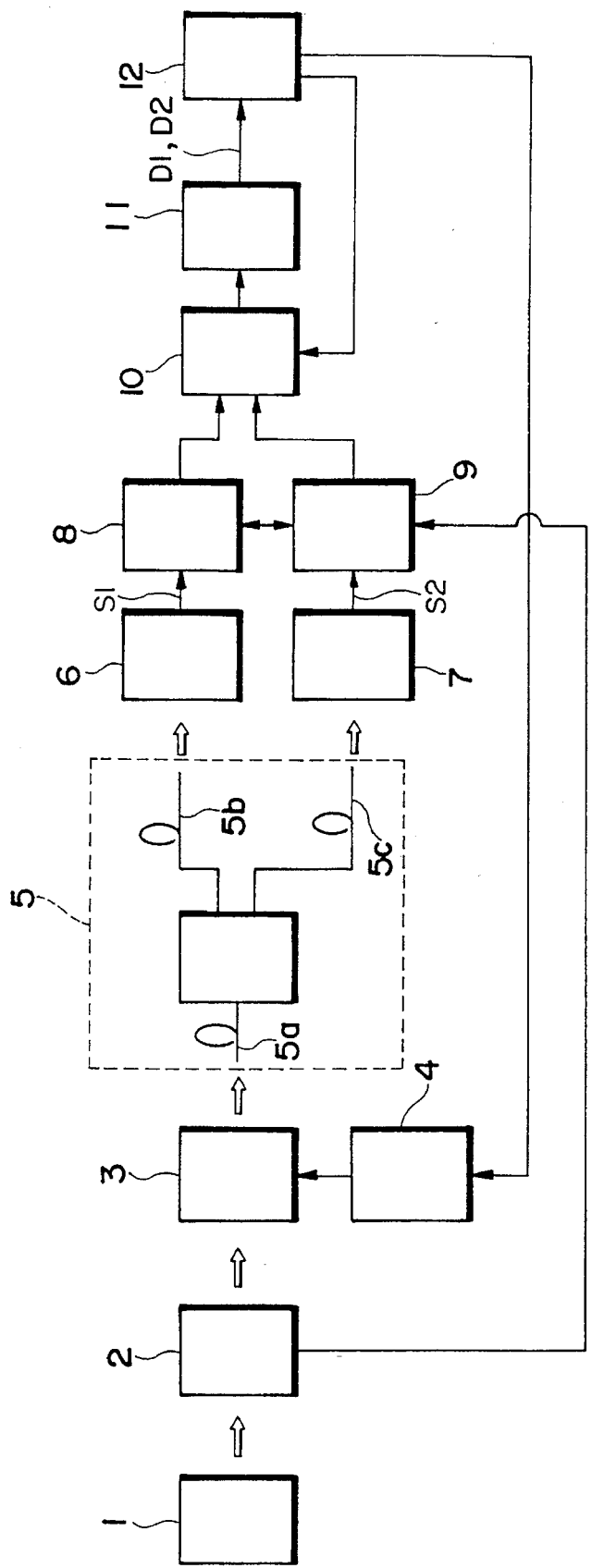
FIG. 7 is a block diagram of a conventional optical fiber component characteristics measuring device.

The first light emitting device 42 is provided with a light emitting diode which emits light having a peak at a 1300 nm-wavelength and a broad spectral characteristic as shown in FIG. 3, i.e., having a broad spectral characteristic widely diffracted from the peak. The second light emitting device 43 is provided with a light emitting diode having a peak at a 1550 nm-wavelength and a broad spectral characteristic as shown in FIG. 4. The third light emitting device 44 is provided with a light emitting diode having a peak at a 650 nm-wavelength and having a broad spectral characteristic as shown in FIG. 5. The fourth light emitting device 45 is provided with a photoemitting diode having a peak at a 860 nm-wavelength and a broad spectral characteristic as shown in FIG. 6.

All the optical fibers 46a–46e of the optical fiber coupler 46 are provided by optical fibers which have the same spectral characteristics and pass the light of the wavelength ranges of FIGS. 3 to 6. Accordingly the light from the first to the fourth light emitting devices 42–45 can be mixed by the optical fiber coupler 46 as they are to be passed through the output optical fiber 46e.

The mixed light from the output optical fiber 46e is incident on an input optical fiber 47a of the optical switch 47. Output optical fibers 47b, 47c of the optical switch 47 are coupled to the input optical fibers 48a, 48b of the optical fiber coupler 48 to be measured. The output optical fibers 47b and 47c are respectively connected to input optical fibers 48a and 48b by optical connectors. The optical switch 47 switches in response to a control signal CH1 from a signal analyzing circuit 55 which will be explained later so that the light incident on the input optical fiber 47a is outputted to one of the input optical fibers 47b, 47c. That is, the optical coupler 47 supplies the mixed light prepared by the optical fiber coupler 46 to one of the input optical fibers 48a, 48b of the optical fiber coupler to be measured 48. The respective optical fibers 47a–47c of the optical switch 47 have the same spectral characteristic as those 46a–46e of the optical fiber coupler 46.

The output mechanism includes an optical switch 49, a first input optical fiber 49a of the optical switch 49, which is coupled to the output optical fiber 48c of the optical fiber coupler 48 to be measured through an optical connector, a second input optical fiber 49b coupled to the output optical fiber 48d of the optical fiber coupler 48 to be measured through the optical connector, a third input optical fiber 49c of the optical switch 49 coupled to the output optical fiber 48e of the optical fiber coupler 48 to be measured through the optical connector, and a fourth input optical fiber 49d of the optical switch 49 coupled to the output optical fiber 48f of the optical fiber coupler 48 to be measured through the optical connector.

The optical switch 49 switches in response to a switch control signal CH2 from a signal synthesizing circuit 55 which will be explained later, so that the light incident on the input optical fibers 49a–49d is supplied to the output optical fiber 49e sequentially one by one. The respective optical fibers 49a–49e of the optical switch 49 have the same spectral characteristic as those 46a– 46e of the optical fiber coupler 46. The output optical fiber 49e is coupled to a spectroscope 50. The spectroscope 50 outputs a spectrum of the light outputted from the output optical fiber 49e. A linear image sensor 51 is coupled to the spectroscope 50, and includes a plurality of photodetecting pixels which are formed in one row in a set direction and are so arranged that the distributions of the spectra supplied by the spectroscope 50 are opposed to the photodetecting pixels.

When the optical switch 49 switches so as to supply the light from the first input optical fiber 49a to the output optical fiber 49e, a spectrum distribution corresponding to a spectral characteristic of the input optical fiber 48a or 49b of the optical fiber coupler 48 to be measured to the output optical fiber 48c is photoelectrically converted by the photodetecting pixels. When the optical switch 49 switches so as to sequentially supply the light from the input optical fibers 49b–49d to the output optical fiber 49e, spectrum distributions corresponding to spectral characteristics of the input optical fiber 48a or 49b of the optical fiber coupler 48 to be measured to the other output optical fibers 48d–48f are sequentially photoelectrically converted by the photodetecting pixels. In this embodiment, the linear image sensor 51 is provided by a germanium image sensor to improve the photosensitivity between the visible range to the infrared range.

Pixel signals S generated at the respective photodetecting pixels of the linear image sensor 51 are read by a read control circuit 52 in a time series in synchronization with a set read scan cycle and sequentially converted by an A/D converter 53 into pixel data D for each set bit. These pixel data D are supplied to a signal analyzing circuit 55 with a computing function, as of a microcomputer or others, through an interface circuit 54.

Figure 2:
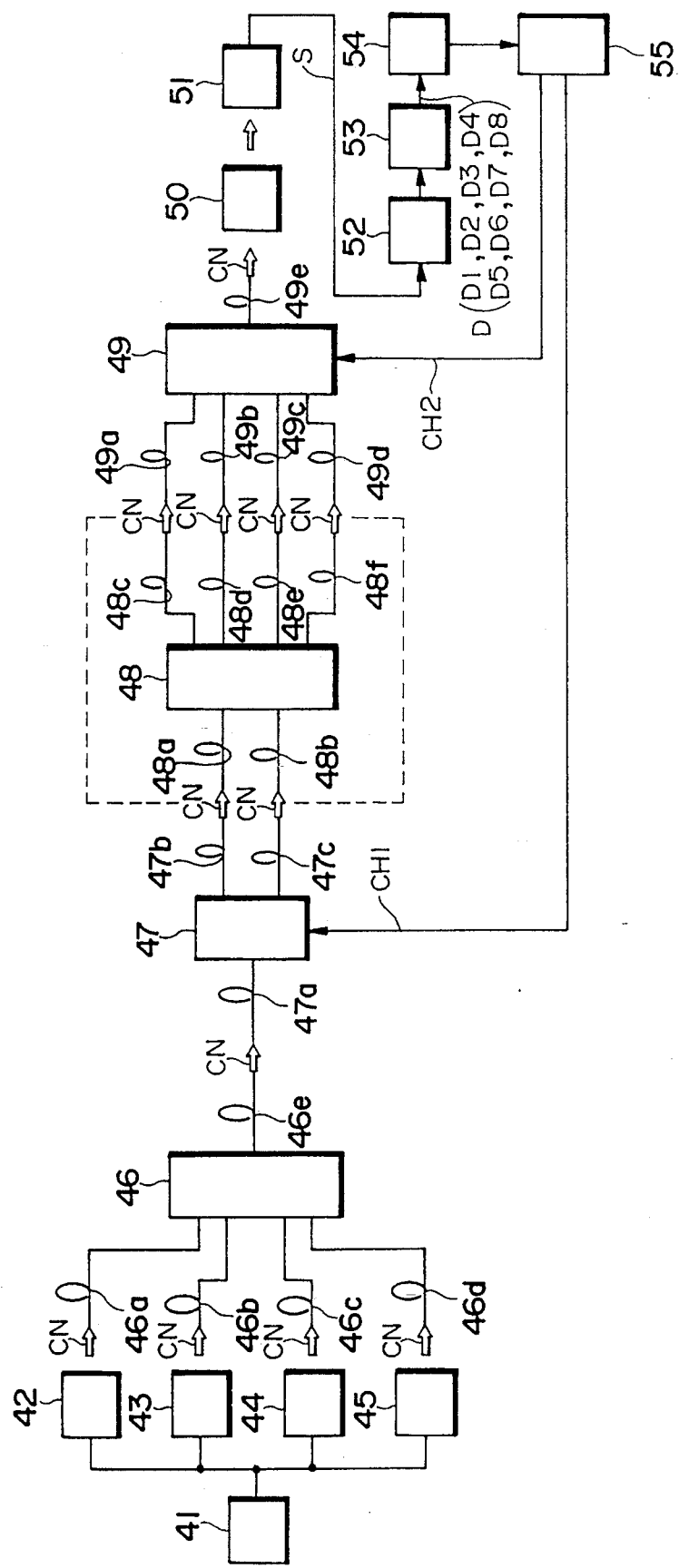
FIG. 2 is a block diagram of the optical fiber component characteristics measuring device according to another embodiment of this invention.

In FIG. 2 the portions indicated by the mark CN are optical connecting means, such as optical connectors and others.

Then, the operation of this embodiment will be explained. When an operator inserts an optical fiber coupler 48 to be measured between the input mechanism and the output mechanism, and the measurement is started, light of set wavelengths from the light sources 42–45 are mixed by the optical fiber coupler 46, and the mixed light is incident on the input optical fiber 47a of the optical switch 47.

The optical switch 47 outputs, in response to a switch signal CH1, the light incident thereon to one 47b of the output optical fibers of the optical switch 47. The output light of the output optical fiber 47 of the optical switch 47 is incident on the input optical fiber 48a of the optical fiber coupler 48 to be measured coupled thereto by the optical connector.

The mixed light is separated in accordance with the respective spectral characteristics of the output optical fibers 48c–48f. The light corresponding to a spectral characteristic of the input optical fiber 48a to the output optical fiber 48c is supplied to the first input optical fiber 49a, the light corresponding to a spectral characteristic of the input optical fiber 48a to the output optical fiber 48d is supplied to the second input optical fiber 49b of the optical switch 49, the light corresponding to a spectral characteristic of the input optical fiber 48a to the third output optical fiber 48e is supplied to the third input optical fiber 49c of the optical switch 49, and the light corresponding to a spectral characteristic of the input optical fiber 48a to the output optical fiber 48f is supplied to the fourth input optical fiber 49d of the optical switch 49.

The optical switch 49 sequentially outputs, in response to a switch control signal CH2, the light from the first to the fourth input optical fibers 49a–49d respectively for a set period time to the spectroscope 50.

The spectroscope 50 generates a spectrum of the light, which is sequentially supplied thereto for the set period of time, and the linear image sensor 51 sequentially photoelectrically converts the spectrum into pixel signals S corresponding to the respective photodetecting pixels. The read circuit 52 reads the respective pixel signals S in a time series, and the A/D converter 53 converts the pixel signals S into pixel data D. The data D are supplied to the signal analyzing circuit 55 through the interface circuit 54.

The signal analyzing circuit 55 provides pixel data D1 corresponding to the light which has entered the optical fiber coupler 48 at the input optical fiber 48a and exited the same at the output optical fiber 48c, pixel data D2 corresponding to the light which has entered the optical fiber coupler 48 at the input optical fiber 48a and exited the same at the output optical fiber 48d, pixel data D3 corresponding to the light which has entered the optical fiber coupler 48 at the input opticla fiber 48a and exited the same at the output optical fiber 48e, pixel data D4 corresponding to the light which has entered the optical fiber coupler 48 at the input optical fiber 48a and exited the same at the output optical fiber 48f.

Then, in response to a switch signal CH 1 from the signal analyzing circuit 55, the optical switch 47 is switched to output the light incident on the optical switch 47 at the output optical fiber 47c thereof. The light outputted from the output optical fiber 47c of the optical switch 47 is incident on the input optical fiber 48b of the optical fiber coupler 48 to be measured. The input optical fiber 48b is coupled to the output optical fiber 47c by the optical connector.

Then the above-described operation repeatedly follows, and the signal analyzing circuit 55 produces pixel data D5 corresponding to the light which has entered the optical fiber coupler 48 to be measured at the input optical fiber 48b and exited the same at the output optical fiber 48c, pixel data D6 corresponding to the light which has entered the optical fiber coupler 48 to be measured at the input optical fiber 48b and exited the same at the output optical fiber 48d, pixel data D7 corresponding to the light which has entered the optical fiber coupler 48 to be measured at the input optical fiber 48b and exited the same at the output optical fiber 48e, and pixel data D8 corresponding to the light which has entered the optical fiber coupler 48 to be measured at the input optical fiber 48b and exited the same at the output optical fiber 48f.

Then, the analyzing circuit 55 corrects the thus-obtained pixel data D1, D2, D3, D4, D5, D6, D7, D8, based on a spectral characteristic intrinsic to the whole of the input and the output mechanisms, and the corrected pixel data D1', D2', D3', D4', D5', D6', D7', D8' are used as actual spectrum data. These pixel data D1', D2', D3', D4', D5', D6', D7', D8' are subjected to signal processing, or displayed on a monitor television to present the operator results of the measured spectral characteristics.

In this other embodiment, reference incident light to be incident on the optical fiber coupler to be measured is generated by the stationary optical mechanism in place of the mechanical sweep means, such as the chopper mechanism and the controller in the conventional apparatus. Accordingly mechanical precision and transient deflections are not problems, a measuring time can be decreased, and improved S/N ratios can be obtained.

In this embodiment, the measurement of spectral characteristic of a 2×4 optical fiber coupler has been explained, but this invention is not limited to this embodiment. Instead it is possible that the optical fiber coupler 46 is replaced by an n×m optical fiber coupler (n and m represent arbitrary numbers, the 4×1 optical switch 49 is replaced by an m×1 optical switch, the light from the n-light sources is incident on m-optical fiber couplers, and spectra outputted from the spectroscope every time the m×1 optical switch is switched is photoelectrically converted by the linear image sensor 51. This structure makes the optical fiber component spectral characteristics measuring apparatus universal.

In the above-described two embodiments, the light sources are provided by photodiodes having the infrared range but is not limited to such photodiodes. Super-luminescence diodes or multi-quantum well laser diodes may be used.

In the above-described two embodiments linear image sensors are used. Alternatively, a photodiode array including a plurality of photodiodes arranged along the spectrum distributions may be used.

In the above-described two embodiments, the device according to this invention is used in measuring spectral characteristics of optical fiber couplers. Alternatively, this invention can be used in measuring characteristics of optical fiber filters.

The optical fiber component characteristics measuring apparatus according to this invention can measure polarization characteristics of optical fiber components by inserting a polarizer on the side of light incidence of an optical fiber component (e.g., optical fiber coupler, optical fiber filter or others), and an analyzer on the side of output of light thereof.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for measuring spectral characteristics of an optical fiber component which includes an input optical fiber and two output optical fibers in accordance with respective spectral characteristics of light and which separates a mixed light into respective wavelengths, the apparatus comprising:

an input mechanism for providing the mixed light to the optical fiber component, the input mechanism comprising:
  a plurality of light sources for respectively emitting light of set wavelengths;
  optical coupling means optically connected to the plurality of light sources for generating the mixed light by mixing light emitted from the plurality of light sources; and
  an output optical terminal connected to the optical coupling means for supplying the mixed light to the input optical fiber of the optical fiber component; and an output mechanism for obtaining spectral characteristic data of a selected light output from the optical fiber component, the output mechanism comprising:
  two input optical terminals for respectively inputting light from the two output optical fibers of the optical fiber component corresponding thereto;
  optical switching means for selecting one of the input optical terminals;
  spectroscoping means for spectroscoping the selected light and for providing a spectrum of the selected light, the spectroscoping means being selectively optically connected to one of the input optical terminals by the optical switching means; and
  photoelectric conversion means for in parallel detecting wavelengths included in the spectrum provided by the spectroscoping means and for converting a distribution of the spectrum into electric signals as spectral characteristic data.

2. An apparatus according to claim 1, wherein the plurality of light sources are light emitting diodes, super-luminescence diodes, or multi-quantum well laser diodes.

3. An apparatus according to claim 1, wherein the photoelectric conversion means is a linear image sensor including a plurality of pixels arranged along distributions of the spectrum.

4. An apparatus according to claim 1, wherein a polarizer is inserted on a side of light incidence to the optical fiber component and an analyzer is inserted on an output side of the optical fiber component.

5. An apparatus according to claim 1, wherein the photoelectric conversion means is a photodiode array including a plurality of photodiodes arranged along the distribution of the spectrum.

6. An apparatus according to claim 1, wherein the output mechanism further comprises means for controlling the optical switching means so as to optically connect the spectroscoping means to one of the two output optical fibers of the optical fiber component.

7. An apparatus according to claim 1, wherein the output optical terminal is an optical fiber, and wherein each of two input optical terminals is an optical fiber.

8. An apparatus for measuring spectral characteristics of an optical fiber component which includes a plurality of input optical fibers and a plurality of output optical fibers in accordance with respective spectral characteristics of light and which separates a mixed light into respective wavelengths, the apparatus comprising:

an input mechanism for providing the mixed light to the optical fiber component to be measured, the input mechanism comprising:
  a plurality of light sources for respectively emitting light of set wavelengths;
  optical coupling means optically connected to the plurality of light sources for generating the mixed light by mixing light emitted from the plurality of light sources;
  a plurality of output optical terminals for supplying the mixed light to the plurality of input optical fibers of the optical fiber component corresponding thereto; and
  first optical switching means disposed between the optical coupling means and the plurality of output optical terminals, the first optical switching means being constructed and arranged to allow the optical coupling means to be optically connected to any one of the output optical terminals; and an output mechanism for obtaining spectral characteristic data of a selected light output from the optical fiber component, the output mechanism comprising:
  a plurality of input optical terminals for respectively inputting the lights from the plurality of output optical fibers of the optical fiber component corresponding thereto, the number of the input optical terminals being greater than that of the output optical terminals;
  second optical switching means for selecting one of the input optical terminals;
  spectroscoping means for spectroscoping the selected light and for providing a spectrum of the selected light, the spectroscoping means being selectively optically connected to one of the input optical terminals by the optical switching means; and
  photoelectric conversion means for in parallel detecting wavelengths included in the spectrum provided by the spectroscoping means and for converting a distribution of the spectrum into electric signals as spectral characteristic data.

9. An apparatus according to claim 8, wherein the output mechanism further comprises means for controlling the first optical switching means so as to selectively optically connect the optical coupling means to one of the input optical fibers of the optical fiber component and for controlling the second optical switching means so as to selectively optically connect the optical coupling means to one of the output optical fibers of the optical fiber component.

10. An apparatus according to claim 8, wherein the plurality of light sources are photodiodes, super-luminescence diodes, or multi-quantum well laser diodes.

11. An apparatus according to claim 8, wherein the photoelectric conversion means is a linear image sensor including a plurality of pixels arranged along distributions of the spectrum.

12. An apparatus according to claim 8, wherein the photoelectric conversion means is a photodiode array including a plurality of photodiodes arranged along the distribution of the spectrum.

13. An apparatus according to claim 8, wherein a polarizer is inserted on a side of light incidence to the optical fiber component and an analyzer is inserted on an output side of the optical fiber component.

14. An apparatus according to claim 8, wherein the plurality of output optical terminals are optical fibers, and wherein the plurality of input optical terminals are optical fibers.

* * * * *